United States Patent [19]

Bedell

[11] 4,080,346

[45] Mar. 21, 1978

[54] NOVEL GRAFT COPOLYMERS HAVING VINYLBENZYL AMMONIUM HALIDE RESIDUES

[75] Inventor: Stanley F. Bedell, Andover, Mass.

[73] Assignee: Polaroid Corporation, Cambridge, Mass.

[21] Appl. No.: 706,463

[22] Filed: Jul. 19, 1976

Related U.S. Application Data

[60] Continuation-in-part of Ser. No. 502,985, Sep. 3, 1974, abandoned, which is a continuation-in-part of Ser. No. 320,451, Jan. 2, 1973, abandoned, which is a division of Ser. No. 156,035, Jun. 23, 1971, Pat. No. 3,756,814, which is a continuation-in-part of Ser. No. 58,685, Jul. 27, 1970, abandoned.

[51] Int. Cl.$^2$ .................... C08L 1/08; C08L 77/00; C08L 51/00

[52] U.S. Cl. .................... 260/17 A; 96/29 R; 96/87 R; 260/17.4 GC; 260/857 R; 260/875; 260/883; 260/884; 260/886

[58] Field of Search ........ 260/17 A, 17.4 GC, 857 R, 260/875, 883, 884, 886

[56] References Cited

U.S. PATENT DOCUMENTS

| | | | |
|---|---|---|---|
| 2,701,243 | 2/1955 | Reynolds et al. | 260/79.3 |
| 2,922,768 | 1/1960 | Mino et al. | 260/17 A |
| 3,083,118 | 3/1963 | Bridgeford | 428/375 |

Primary Examiner—Lucille M. Phynes
Attorney, Agent, or Firm—John P. Morley

[57] ABSTRACT

Novel graft polymers particularly useful as diffusion transfer image dye mordants.

24 Claims, No Drawings

NOVEL GRAFT COPOLYMERS HAVING VINYLBENZYL AMMONIUM HALIDE RESIDUES

CROSS REFERENCE TO RELATED APPLICATIONS

This application is a continuation-in-part of the now abandoned U.S. Application Ser. No. 502,985 filed Sept. 3, 1974 which in turn is a continuation-in-part of the now abandoned Application Ser. No. 320,451 filed Jan. 2, 1973 which in turn is a division of U.S. Application Ser. No. 156,035 filed June 23, 1971 and now U.S. Pat. No. 3,756,814 which in turn is a continuation-in-part of U.S. Application Ser. No. 58,685 filed July 27, 1970 and now abandoned.

BACKGROUND OF THE INVENTION

The present invention relates to novel graft copolymers having a dye mordanting capability. Accordingly, the novel graft copolymers of the present invention are particularly useful in diffusion transfer film products and details relating to their use in such products are described in my above-mentioned U.S. Pat. No. 3,756,814 which is expressly incorporated here in its entirety.

The primary object of the present invention is to provide novel graft copolymers having a dye mordanting capability.

Another object is to provide novel graft copolymers having temperature-inverting permeability characteristics.

Still another object of the present invention is to provide novel graft copolymers obtainable in greater than 99% conversion yields.

Another object of the present invention is to provide novel graft copolymers capable of forming aqueous emulsions that are characterized by excellent stability, high solids content, low viscosity, and coatability at neutral and/or high alkaline pH.

Still another object of the present invention is to provide novel graft copolymers having the same mole ratio of reactants, but having different alkali permeability characteristics.

Other objects of the invention will in part be obvious and will in part appear hereinafter.

SUMMARY OF THE INVENTION

Broadly, the novel graft polymers or copolymers of the present invention comprise the following structure:

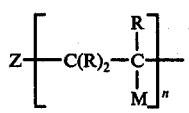

wherein Z is an organic polymeric backbone comprising repeating units having structural units capable of being oxidized by a transition metal ion catalyst of a first oxidation state; said catalyst having an oxidation potential, in acidic solution, of at least about 1 volt when the transition metal is reduced to the next lowest acidic solution stable oxidation state. The grafted entity, e.g.,

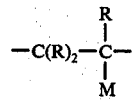

is the grafted residue of a graftable compound where M is a moiety which can provide a mordant capability; each R is the same or different substituent which will not hinder grafting of the mordant through the vinyl group but is preferably hydrogen; and $n$ is a positive integer.

DESCRIPTION OF THE PREFERRED EMBODIMENTS

In accordance with the present invention, novel graft polymers or copolymers are presented which comprise a moiety that can provide a mordant capability grafted to, e.g., pendant from, the backbone of the polymer substrate. The novel graft polymers of the present invention are particularly useful as dye mordant compositions for image receiving layers of diffusion transfer color image receiving elements. Image-receiving elements comprising the graft polymers of the present invention provide images exhibiting excellent dye densities over a wide temperature range, with faster dye transfer as compared with compounds described in the prior art. Moreover, such images are characterized by superior light stability, and reduced degree of darkening. It has further been discovered that the novel graft polymers or copolymers employed in the present invention can be coated from solution at a higher solids content than the materials or the prior art, resulting in increased coating efficiency; they are coatable at neutral pH and hence their use can obviate the stability problems inherent in the use of volatile, diffusable acids as coating adjuncts. Moreover, their coatings are molecularly homogeneous, resulting in more uniform image quality and freedom from mottle as compared with prior art image-receiving layers. Additionally, the novel graft polymers and/or copolymers of the present invention exhibit permeability at least in part inversely dependent upon temperature.

Polymeric films having inverse temperature dependence with regard to alkali permeability have been disclosed for utilization as spacer layers in color diffusion transfer photographic receiving sheets. Polymers comprising such films generally exhibit the property of being relatively soluble in cold water, that is, water at a temperature of less than about 40° to 80° C., the precise temperature being dependent upon the polymer specifically selected for employment; and relatively insoluble in hot water, that is, water at a temperature about 80° C., the precise temperature being dependent upon the polymer selected. A relatively large number of such polymers are substantially insoluble in caustic photographic processing media over the range of photographic diffusion transfer processing. Such polymers, however, are permeable to photographic alkaline processing composition as a function of their swelling, which, in turn, is believed to be a function of the free energy of solution decrease caused, at least in part, by the heat evolved as a result of the interaction between the polymer and the processing composition solvent and by an increase of the entropy of the system. This free energy decrease is believed to lessen with increased temperature of the environment and result in a decreased swelling, and thus decrease photographic processing composition permeability with such temperature increase.

Benefits are derived from using a temperature-inverting material in a process which depends upon permeation of liquids, at a variety of temperatures, since, as the ambient temperature decreases, the polymer tends to form hydrates and swells, thus facilitating permeation as a function of the degree of swell of the polymer-deswelling being inherent with an increase in temperature. It is well known that the diffusion rate of a liquid, for example, an alkali, will increase as the temperature increases. Since, in a typical diffusion transfer photographic process this rate is directly proportional to the progress of the transfer image formation per unit time, the benefit of devising a mechanism for controlling the diffusion rate inversely with temperature is recognized. The desired result is to have the temperature-inverting material approximately counteract changes in temperature. Temperature inversion is, therefore, relative, since the precise properties desired would be dependent upon the response of the whole system to changes in temperature.

Extreme inverse temperature characteristics are generally not particularly desirable since the development of the photosensitive part of the system and the dye transfer are temperature dependent processes and should be functionally compatible with the temperature-permeation properties of the receiving sheet. An ideal image-receiving element, therefore, should provide the system which it comprises with the proper dye permeation-temperature properties so that dye may diffuse from the photosensitive part of the system to the receiving sheet, as a function of development, in order to form a positive image in the receiving sheet within a predetermined time, irrespective of the processing temperature employed.

It will be obvious that where the image-receiving layer of the image-receiving element comprises a temperature-inverting polymeric mordant, not only is the temperature-permeation of the system enhanced, but also a technique is provided for evening out the dye uptake of the layer over an extended temperature range. Specifically, at lower temperatures where the processing composition transfer rate is slower, the increased permeability of the layer renders the mordanting sites more readily available to the diffusing image-forming components; the increase in processing composition transfer rate which takes place as the processing temperature is increased is compensated for by the corresponding decrease in permeability and availability of mordanting sites in the image-receiving layer. Thus, by means of the present invention, an image-receiving layer is provided for diffusion transfer color photographic processes wherein mordanting of dye image-forming material is substantially uniform over a wide range of temperatures.

The temperature-inverting characteristic of members of the class of graft polymers and/or copolymers useful in the instant invention is probably attributable to the presence of a predetermined balance of hydrophobic groups to hydrophilic groups in the polymer molecule. The probable mechanism through which temperature inversion occurs is by the formation of hydrogen bonds between the hydrophilic portion of the polymer and the hydrogen of the solvent at low temperatures; the hydrogen bonding being discouraged as the temperature of the material is raised due to thermal destruction. The system thereupon takes the form of a less-hydrated, less-swollen, therefore, less-permeable polymer as a function of the increase in temperature. It may then be said that the preferred polymers useful in the practice of the present invention are those which contain hydrophilic groups which cause swelling as a function of the solvatability of that group in a given solvent, and hydrophobic groups which modulate the swelling so that at some definite ratio of hydrophilic to hydrophobic groups, the resultant compound will have temperature-inverting properties. It may further be concluded, that the interactions responsible for temperature inversion are forces such as hydrogen-bonding and hydrophilic-hydrophobic bonding forces.

The preferred polymeric backbone e.g., Z, of the novel graft polymers of the present invention are substituted or unsubstituted polyvinyl polymers or polycellulosics preferably selected from the group consisting of polyvinyl alcohols, poly-N-vinylpyrrolidones, polyamides, celluloses, substituted celluloses such as alkyl celluloses, hydroxyalkyl celluloses, alkyl hydroxyalkyl celluloses, etc.

As mentioned, the polymeric backbone materials comprise structural units having groups capable of being oxidized by a transition metal ion catalyst. Such groups include those conforming to the formula

group, where Y can be hydroxy, amino, mercapto, carboxy and acyl. It is believed that upon oxidation of the

group a free radical is formed, which attacks the graftable site of the compound providing the mordant capability thus providing the novel graft polymer and/or copolymer.

Graftable compounds which provide a mordant capability for the polymers of the present invention are those which in their monomeric form, conform to the following formula:

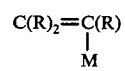

where, as described before,

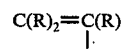

represents a graftable vinyl site and M is a moiety providing a mordant capability. More precisely, the graft polymers of the present invention comprise a polymeric backbone having grafted thereto at least one of the following graftable compounds 1) 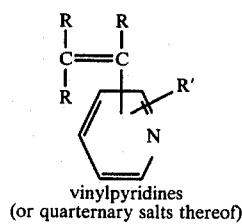
vinylpyridines
(or quarternary salts thereof)

2) 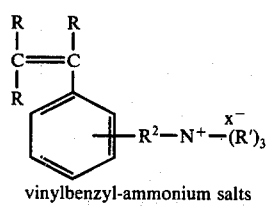
vinylbenzyl-ammonium salts where each R' can be the same or different substituent selected from the group consisting of hydrogen, an alkyl radical preferably having from 1–10 carbon atoms or a carbocyclic radical such as aryl, araalkyl and cyclic alkyl; $R^2$ is an alkylene radical having from 1–8 carbon atoms; X represents an anion such as an aryl sulfonate anion, e.g., benzenesulfonate, p-toluenesulfonate etc., an alkylsulfonate anion, e.g., methyl sulfate, ethyl sulfate, n-propyl sulfate, n-butyl sulfate etc., or X can be a halide ion, e.g., iodide, chloride, bromide or other acid anion radical.

Representative vinyl pyridines or quarternary salts thereof particularly preferred in the practice of the present invention include 4-vinyl pyridine, 5-vinyl-2methyl pyridine, 2 vinyl pyridine, 5 vinyl-2 methyl pyridine tosylate, etc. Representative preferred vinylbenzyl ammonium halides include vinylbenzyl trimethyl ammonium chloride, vinylbenzyl trihexyl ammonium chloride, vinylbenzyl dimethylcyclohexyl ammonium chloride, vinylbenzyl dimethylbenzyl ammonium chloride, vinylbenzyl triethyl ammonium chloride and others of the following formulae:

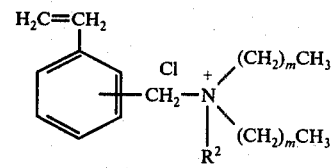

where $m = 0–5$ and $R^2 = (CH_2)_m CH_3$,

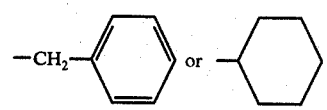

Examples of particularly preferred graft polymers of the present invention are:

1. 4-vinylpyridine grafted on polyvinyl alcohol

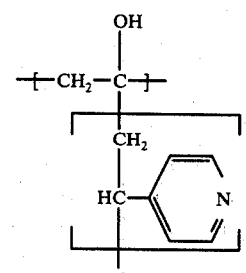

2. 5-vinyl-2-methylpyridine grafted on polyvinyl alcohol

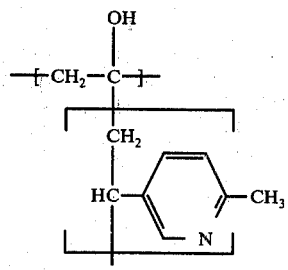

3. 4-vinylpyridine grafted on methyl cellulose

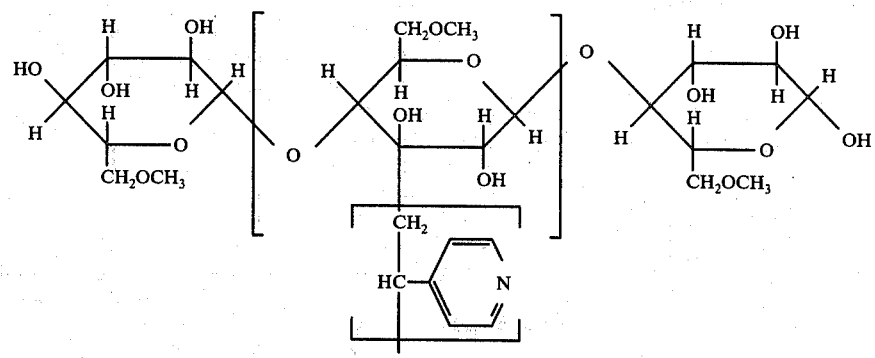

4. 4-vinylpyridine grafted on hydroxyethyl cellulose

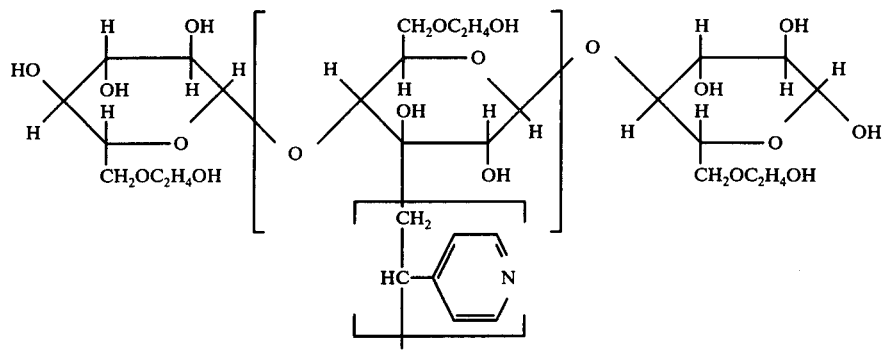

5. vinylbenzyl-trialkyl-ammonium halides grafted on polyvinyl alcohol

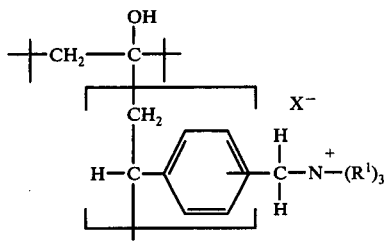

where $R^1$ is alkyl having from about 1–6 carbon atoms and X is a halide.

6. 4-vinylpyridine grafted on poly-N-vinylpyrrolidone.

7. 5-vinyl-2-methyl pyridine grafted on hydroxyethyl-cellulose.

8. 4-vinylpyridine, vinylbenzyl-trimethyl-ammonium chloride grafted on hydroxyethyl-cellulose.

9. vinylbenzyl-trimethyl-ammonium chloride grafted on hydroxyethylcellulose.

10. vinylbenzyl-trimethyl-ammonium chloride grafted on polyvinyl alcohol.

11. 4-vinylpyridine and vinylbenzyl-trimethyl-ammonium chloride grafted on polyacrylamide.

12. 4-vinylpyridine and vinylbenzyl-dimethyl benzyl-ammonium chloride grafted on hydroxyethyl cellulose.

13. 4-vinylpyridine and vinylbenzyl-dimethyl cyclohexyl-ammonium chloride grafted on hydroxyethyl cellulose.

14. vinylbenzyl-dimethyl benzyl-ammonium chloride grafted on polyvinyl alcohol.

15. vinylbenzyl-dimethyl benzyl-ammonium chloride grafted on hydroxyethylcellulose.

16. 4-vinyl pyridine and vinylbenzyl-trimethyl-ammonium chloride grafted on polyvinyl alcohol.

Also, the particularly preferred graft polymers of the present invention are those where the weight percent of backbone to grafted vinylpyridine or vinylbenzyl ammonium halide or the total of both is between about 10% to about 90% backbone by weight of the graft polymer. Particularly preferred are those grafts where the weight percent of backbone is between about 20% to about 70% backbone by weight of the graft polymer(s).

Of the above listed representative preferred graft polymers of the present invention, those containing a mixture of a vinyl pyridine and a vinyl benzyl alkyl ammonium halide grafted to the polymeric backbone — especially to a polyvinyl alcohol or hydroxyalkyl cellulose backbone — are particularly preferred. Such graft polymers provide excellent mordants and latices containing them are remarkably stable. For example, latices containing the particularly preferred graft polymers have been steam distilled and the presence of salts in high concentrations does not affect the stability of the latices.

The graft polymers or copolymers of the present invention may be prepared, in general, by oxidizing an organic polymeric backbone material defined before with a transition metal ion catalyst, in the presence of the mordant monomer(s). Generally, a 1–10%, by weight, aqueous solution of the backbone polymer is deaerated for about 30 minutes with stirring. The monomer is then added and nitrogen is bubbled through the solution for about 1 hour. At this point, the nitrogen is passed over the stirred solution and the pH adjusted to around 1.5 with concentrated acid. The catalyst is dissolved in a minimum amount of water, quickly added to the polymerization mixture and stirring continued under the nitrogen atmosphere for at least 2 more hours with stirring times up to 24 hours giving no adverse effect to the graft copolymer. The resulting graft polymers are obtained from the reaction vessel in the form of aqueous solutions. They may then be coated directly from solution to provide novel image-receiving layers. However, in preferred embodiments, the pH is raised, e.g., with $NH_3$, to a point at which an aqueous emulsion is formed, generally a pH of around 7, depending at least in part upon the ratio of catalyst to backbone polymer and backbone polymer to mordant monomer.

The choice of catalyst is wide ranging, with particularly good results being obtained when catalysts containing $CE^{+4}$, $V^{+5}$ and $Cr^{+6}$ are employed in making the graft polymers of the present invention.

Although the pH is generally adjusted to around 1.5 with concentrated nitric acid, pH's of up to about 7 have proven operative in some instances, depending at least in part on the ratio of catalyst to backbone polymer.

Graft polymers of the present invention can also be prepared by grafting a mordant precursor to a polymeric backbone material in the manner described above and thereafter reacting the graft copolymer with a compound that can provide a mordanting capability. For example, vinylbenzyl halides can be grafted to the polymeric backbone materials and the resultant graft polymer reacted with a tertiary amine of the formula:

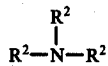

where $R^2$ is as defined before.

In preparing the graft polymers or copolymers of the present invention the weight ratio of backbone/catalyst can be used to control such factors as the particle size of the polymer as well as the temperature permeability characteristics of layers containing the graft polymers. In general, the larger the ratio, the larger the particle size of the polymer. Also, it has been generally found that for any given polymer, the temperature-permeability characteristics of the layers prepared therefrom can be manipulated by the judicious choice of backbone/catalyst weight ratio. In general, any two polymers having the same backbone, comprised of the same monomers, and having the same monomer to backbone polymer ratio, will result in layers having different diffusion characteristics if they are prepared in the presence of different backbone/catalyst ratios. In general, increasing the backbone/catalyst ratio results in increased permeability. Suitable backbone to catalyst weight ratios are from about 1–20 but generally a backbone to catalyst weight ratio from about 2 to about 10 is the most useful range irrespective of the monomers used.

As was stated hereinbefore, any transition metal ion catalyst of a first oxidation state having an oxidation potential, in acidic solution of at least about 1 volt when the transition metal is reduced to the next lowest acidic solution stable oxidation state, is operable in the present invention. As preferred catalysts, mention may be made of transition metal ion catalysts comprised of a member selected from the group consisting of $V^{+5}$, $Ce^{+4}$ and $Cr^{+6}$.

The following examples illustrate preparations of the preferred graft polymers of the present invention. From the foregoing discussion, it will be appreciated that employment of the graft copolymers of the present invention, in addition to providing an especially effective dye mordant function, can assist in evening out the temperature response characteristics of the diffusion transfer color photographic units in which they are employed, by acting at least in part as a "timing valve" for the processing composition. Ordinarily, if the processing temperature is too hot and no temperature inverting layer is used, poor dye densities and "gappiness" may be evident in the photographic image, which are believed to be due to the premature neutralization of the processing composition; when the temperature is cold and no temperature inverting timing layer is used, the neutralization of the developing composition is too slow, and may result in the maintenance of undesirable salts in the top layer of the photographic image, causing dull, muddy colors.

The present invention will be illustrated in greater detail in conjunction with the following procedures and processes utilized in providing the novel graft copolymers of the present invention, and which set out representative photographic products and processes employing the novel graft copolymers, which, however, are not of limiting effect and are intended to be illustrative only.

EXAMPLE I

A graft copolymer of 4-vinylpyridine on polyvinyl alcohol having a polyvinyl alcohol/4-vinylpyridine weight ratio of 2/1 was prepared as follows using a polyvinyl alcohol/catalyst weight ratio of about 18:

To a deairated solution of 20 g. of polyvinyl alcohol in 500 cc. of water was added 10 g of 4-vinylpyridine, with stirring under an atmosphere of nitrogen. Nitrogen was bubbled through the solution for 1 hour, after which the temperature of the solution was raised to 50° C., the pH was adjusted to 1.5 with concentrated nitric acid, and 1.1 g. of $Ce(NH_4)_2(NO_3)_6$ in 20 cc. of water was added. Stirring was continued for 2 more hours, at the end of which the desired copolymer was obtained as an aqueous solution; the pH of the solution was raised to a point at which an aqueous emulsion was formed with concentrated $NH_3$. The product polymer was dialyzed to remove any excess ammonium nitrate salt.

EXAMPLE II

A graft copolymer of 4-vinylpyridine on polyvinyl alcohol having a polyvinyl alcohol/4-vinylpyridine weight ratio of 2/1 was prepared with a polyvinyl alcohol/catalyst weight ratio of about 4.5 by the procedure of Example I using 4.4 g of $Ce(NH_4)_2(NO_3)_6$, except that the reaction was carried out at room temperature and stirring was continued overnight.

EXAMPLE III

A graft copolymer of 4-vinylpyridine on polyvinyl alcohol having a polyvinyl alcohol/4-vinylpyridine weight ratio of 2/1 was prepared with a polyvinyl alcohol/catalyst weight ratio of about 3.6 by the procedure of Example I, using a 5.5 g. $Ce(NH_4)_2(NO_3)_6$.

EXAMPLE IV

A graft copolymer of 4-vinylpyridine on polyvinyl alcohol having a polyvinyl alcohol/vinylpyridine weight ratio of 1/3 was prepared with a polyvinyl alcohol/catalyst weight ratio of about 1.8 by the procedure as outlined in Example I using 20 g. of polyvinyl alcohol, 60 g. of 4-vinylpyridine, and 11.0 g. of $Ce(NH_4)_2(NO_3)_6$ in 25 cc. of water.

EXAMPLE V

Two graft copolymers of 4-vinylpyridine on hydroxyethyl cellulose were prepared by the procedure described in Example I, except as follows:

a. graft copolymer having a hydroxyethyl cellulose/4-vinylpyridine weight ratio of 2/1 and a hydroxyethyl cellulose/catalyst weight ratio of 20 was prepared using 22 g. of hydroxyethyl cellulose, 11 g. of 4-vinylpyridine, and 1.1 g. $Ce(NH_4)_2(NO_3)_6$ in 10 cc. of water.

b. graft copolymer having a hydroxyethyl cellulose/4-vinylpyridine weight ratio of 1/3 and a hydroxyethyl cellulose/catalyst weight ratio of 20 was prepared using 22 g. of hydroxyethyl cellulose, 66 g. of 4-vinylpyridine, and 1.1 g. of $Ce(NH_4)_2(NO_3)_6$ in 10 cc. of water.

EXAMPLE VI

Graft copolymers of 4-vinylpyridine on methyl cellulose were prepared as follows:

An aqueous solution of 10 g. of methyl cellulose in 500 cc. of water (Methocel HG 60, 4000 cps., available commercially from Dow Chemical Co., Midland, Mich.) was purged with nitrogen for 2 hours, after which 10 g. of 4-vinylpyridine was added. The pH was adjusted to 1.5 with concentrated nitric acid, and 0.6 g.

of Ce(NH$_4$)$_2$ (NO$_3$)$_6$ was added. The mixture was reacted at 30° C. for 1.5 hours and at 50° C. for 1.5 hours, after which NH$_3$ was added to bring the pH to 7. The resulting precipitated polymer was washed with water and acetone, and recovered as an off-white powder.

A second graft copolymer of 4-vinylpyridine on methyl cellulose was prepared by the same procedure, but using a lower viscosity methyl cellulose (Methocel MC, 400 cps., available commercially from Dow Chemical Co.). Upon addition of NH$_3$, a white latex was obtained, which was dialyzed for 2 days to yield the product polymer.

A third graft copolymer of 4-vinylpyridine on methyl cellulose was prepared by dissolving 50 g. of methyl cellulose (Methocel MC, 10 cps., available commercially from Dow Chemical Co.) in 500 cc. of hot water. 700 cc. of cold water and 100 g. of 4-vinylpyridine, and about 100 g. of concentrated nitric acid, to give a pH of 1.5, were added. After stirring under an atmosphere of nitrogen at room temperature for 2 hours, the solution became cloudy. 300 cc. of water were added, and the temperature was raised to 45° C. The mixture was repeatedly evacuated and vented into nitrogen. Upon addition of 3.0 g. of Ce(NH$_4$)$_2$ (NO$_3$)$_6$ in 15 cc. of water, the mixture gradually became translucent. Stirring was continued overnight at 45°–50° C. after which the reaction product was recovered as a white latex. The copolymer was purified by dialysis and centrifugation, yielding a clear 4.4 weight % aqueous solution.

EXAMPLE VII

A graft copolymer of 4-vinylpyridine on poly-N-vinylpyrrolidone was prepared by the procedure of Example I, using 30 g. of poly-N-vinylpyrrolidone in 500 cc. of water, 15 g. of 4-vinylpyridine, and 10.0 g. of Ce(NH$_4$)$_2$ (NO$_3$)$_6$ in 20 cc. of water. The copolymer was recovered in the form of an aqueous emulsion.

EXAMPLE VIII

To a solution of 11 g. of polyacrylamide in 250 g. H$_2$O was added 5.5 g. 4-vinylpyridine, 5.3 g. conc. HNO$_3$ and 2.75 g. vinylbenzyl-trimethyl-ammonium chloride. Nitrogen was bubbled through the solution for 1 hour; the temperature raised to 50° C. and 0.55 g. Ce(NH$_4$)$_2$-(NO$_3$)$_6$ in 10 cc. H$_2$O was added. Stirring was continued for 16 hours. The pH of the mixture was then adjusted to 8.5 with NH$_3$ and dialyzed to remove ammonium nitrate. An aqueous emulsion is obtained which has a pH of 8.0; the weight ratio of polyacrylamide to 4-vinylpyridine to vinylbenzyl-trimethylammonium chloride is 2:1:0.25 in the graft copolymer so obtained.

EXAMPLE IX

To a solution of 11 g. hydroxyethyl cellulose in 250 ml. H$_2$O was added 5.5 g. 4-vinylpyridine, 5.41 g. concentrated HNO$_3$ and 7.6 g. vinylbenzyltrimethylammoniumchloride. Nitrogen was bubbled through the mixture for 1 hour and the temperature was raised to 50° C. then 1.1 g. Ce(NH$_4$)$_2$(NO$_3$)$_6$ in 10 ml. H$_2$O was added and stirring continued overnight. The pH of the polymerization mixture was then adjusted to 7.0 with concentrated NH$_4$OH. The graft copolymer of hydroxyethyl cellulose having 4 vinylpyridine and vinylbenzyl-trimethyl-ammonium chloride grafted thereto was recovered in the form of an aqueous emulsion having 9.1% solids by weight. The weight ratio of hydroxyethyl cellulose (HEC) to 4-vinylpyridine (4VP) to vinylbenzyl-trimethyl-ammonium chloride was 2/1/1.4.

EXAMPLE X

A graft copolymer of vinylbenzyltrimethylammoniumchloride on hydroxyethyl cellulose was prepared in accordance with the procedure of Example X but no 4-vinylpyridine was used and only 0.5 g. concentrated HNO$_3$ was used.

EXAMPLE XI

The following Example illustrates a method for preparing a graft copolymer of p-vinylbenzyl-triethyl-ammonium chloride on polyvinyl alcohol wherein the weight ratio of polyvinyl alcohol to p-vinylbenzyl-triethyl-ammonium chloride is 1:1.

To a solution of 11 g. polyvinyl alcohol in 200 ml. H$_2$O was added 11 g. vinylbenzyl-triethyl-ammonium chloride. Nitrogen was bubbled through the mixture for 1 hour and the temperature raised to 60° C. then 0.5 g. concentrated HNO$_3$ and 1.6 g. Ce(NH$_4$)$_2$(NO$_3$)$_6$ in 10 mls. H$_2$O was added. Stirring continued for 2½ hours and the graft copolymer was recovered in the form of an aqueous solution having a pH of 5.0 and containing 9.4% solids by weight.

The graft copolymer prepared above conforms to the following structure:

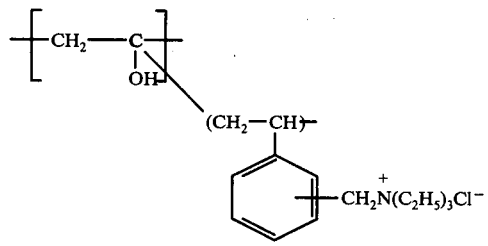

EXAMPLE XII

A graft copolymer of vinylbenzyltrimethylammoniumchloride, 4-vinylpyridine on polyvinyl alcohol wherein the weight ratio of polyvinyl alcohol to vinylbenzyltrimethylammoniumchloride to 4-vinylpyridine was 2/2/1 was prepared in accordance with the procedure of Example XII except that vinylbenzyltrimethylammoniumchloride was used together with 5 g. 4-vinylpyridine, 4.8 g. concentrated HNO$_3$. 2.2 g. Ce(NH$_4$)$_2$ (NO$_3$)$_6$ and the polymerization was run overnight at 60° C. The graft copolymer was recovered as an aqueous emulsion having a pH of 5.0 and containing 11% solids by weight.

EXAMPLE XIII

A series of four image-receiving elements was prepared as follows:

A cellulose nitrate subcoated baryta paper was coated with the partial butyl ester of polyethylene/maleic anhydride copolymer to provide a polymeric acid layer approximately 0.7 mils thick. The external surface of said acid layer was coated with an emulsion comprising a graft copolymer of diacetone acrylamide on polyvinyl alcohol at a coverage of; 750 mgs./ft.$^2$ to provide a spacer layer. (Spacer layers for diffusion transfer color image-receiving elements comprising graft vinylamide copolymers and procedures for preparing such polymers are described in U.S. Pat. Nos. 3,575,700 and 3,575,701. The first element so prepared was then coated, on the external surface of the space layer, with the vinylpyridine graft copolymer of Example I at a pH of 7.4, and the second and third elements were coated at a pH of 6.0 with the vinylpyridine graft copolymers of Examples II and III, respectively, all at coverages of 1000 mg./ft.$^2$. The fourth element was similarly coated at a pH of 4.5 with a 2:1 mixture, by weight, of polyvinyl alcohol and poly-4-vinylpyridine, to serve as a control. The thus-prepared image-receiving elements were baked at 180° F. for 30 minutes and then allowed to cool.

The negative component of the photographic film distributed by Polaroid Corporation, Cambridge, Mass., under the trade designation of Polacolor film Type 108, was employed as the photosensitive element for the image-receiving elements prepared above. Such multicolor, multilayer photo-sensitive elements may be prepared in a manner similar to that disclosed in U.S. Pat. No. 3,345,163 issued Oct. 7, 1967. In general, the photosensitive elements may comprise a support carrying a red-sensitive silver halide emulsion stratum, a green-sensitive silver halide emulsion stratum and a blue-sensitive emulsion stratum. In turn, the emulsions may have dispersed behind them in water-immiscible organic solvents and contained in separate gelatin polymeric layers, respectively, a cyan dye developer, a magenta dye developer, and a yellow dye developer. A gelatin interlayer may be positioned between the yellow dye developer layer and the green-sensitive emulsion stratum, and also between the magenta dye developer layer and the red-sensitive emulsion stratum. The particular dye developers employed in the photosensitive element may comprise, for example, 1,4-bis-($\alpha$-methyl-$\beta$-hydroquinonyl-ethylamino)-5,8-dihydroxyanthraquinone (a cyan dye developer); 2-(p-[2',5'-dihydroxyphenethyl]phenylazo)-4-isopropoxy-1-naphthol (a magenta dye developer); and 1-phenyl-3-n-hexylcarbamyl-4-(p-[hydroquinonyl-ethyl]phenylazo)-5-pyrazolone (a yellow dye developer). The lastmentioned yellow and magenta dye developers are disclosed in U.S. Pat. No. 3,134,764, issued May 26, 1964, and the cyan dye developer is disclosed in U.S. Pat. No. 3,135,606, issued June 2, 1964.

Each of four photosensitive elements were exposed and processed at room temperature by spreading an aqueous liquid processing composition at a pH of not less than about 12 which comprised:

| Water | 100 | cc. |
|---|---|---|
| Potassium hydroxide | 11.2 | g. |
| Hydroxyethyl cellulose (high viscosity) [commercially available from Hercules Powder Co., Wilmington, Delaware, under the trade name Natrasol 2501] | 4.03 | g. |
| Potassium thiosulfate | 0.5 | g. |
| Benzotriazole | 3.5 | g. |
| N-benzyl-$\alpha$-picolinium bromide | 2.3 | g. |
| Lithium hydroxide | 0.3 | g. | between each exposed multicolor element and its respective image-receiving element as they are brought into superposed relationship. After an imbibition of approximately 60 seconds, the image-receiving elements were separated from the remainder of the film assembly.

The following is a tabulation of $D_{max}$ values obtained in the resulting photographic images:

| PVA/catalyst weight ratio in image-receiving layer | red $D_{max}$ | green $D_{max}$ | blue $D_{max}$ |
|---|---|---|---|
| Control | 2.47 | 2.48 | 2.44 |
| 18 (Example I) | 2.55 | 2.55 | 2.55 |
| 4.5 (Example II) | 2.50 | 2.55 | 2.55 |
| 3.6 (Example III) | 2.44 | 2.55 | 2.55 |

It can be seen that the novel graft copolymers of the present invention provide images of excellent dye density over a wide polyvinyl alcohol/catalyst ratio range even when coated at relatively high pH's.

EXAMPLE XIV

In order to evaulate the light stability of photographic images prepared utilizing graft copolymers of the present invention, a series of four photographic images were prepared as in Example XIII, except that the graft copolymers were diluted by half (on a weight basis) with polyvinyl alcohol prior to coating. The images so prepared were subjected to a Xenon arc lamp for specified periods of time, at the end of which the change in $D_{max}$ (magenta image) was measured. The following is a tabulation of the % change (fading) in each of the test images:

| PVA/catalyst weight ratio in image-receiving layer | after 24 hours | after 48 hours | after 9 hours | after 144 hours |
|---|---|---|---|---|
| Control | 22 | 36 | 51 | 58 |
| 18 (Example I) | 14 | 31 | 41 | 48 |
| 4.5 (Example II) | 14 | 24 | 36 | 43 |
| 3.6 (Example III) | 9 | 23 | 32 | 38 |

EXAMPLE XV

A series of six image-receiving elements was prepared, each comprising, in sequence, a transparent cellulose nitrate-subcoated baryta support, and a polymeric acid layer and spacer layer as described in Example XIII. A mordant layer was applied at a coverage of 1000 mg./ft.$^2$ to the first two elements comprising a graft copolymer of 4-vinylpyridine on polyvinyl alcohol having a polyvinyl alcohol/4-vinylpyridine weight ratio of 2/1 and a polyvinyl alcohol/catalyst weight ratio of 3.6 (prepared in Example III supra and coated at a pH of 6.0); to the second two elements comprising a graft copolymer of 4-vinylpyridine on polyvinyl alcohol having a polyvinyl alcohol/4-vinylpyridine weight ratio of 2/1 and a polyvinyl alcohol/catalyst weight ratio of 6.1 (prepared by the same procedure except using 3.3 g. of Ce(NH$_4$)$_2$(NO$_3$)$_6$, and coated at a pH of 6.0); and to the remaining two elements as controls, a 2/1 mixture, by weight, of polyvinyl alcohol and poly-4-vinylpyridine (coated at a pH of 4.5). The thus-prepared image-receiving elements were baked at 180° F. for 30 minutes and then allowed to cool.

Each of the above image-receiving elements was processed by spreading an aqueous liquid processing composition at a pH of not less than about 12 which comprised water, potassium hydroxide, hydroxyethyl cellulose thickener, and thymolphthalein, between each image-receiving element and a superposed stripping sheet comprising a support having a layer of gelatin coated thereon at a coverage of 600 mg./ft.$^2$, after which the image-receiving element and stripping sheet were stripped apart. In each instance, the permeability of the image-receiving element was evaluated by visual determination of the length of time required for the thymolphthalein color to clear (indicating that a pH of 10.5 had been reached.)

The following is a tabulation of the permeation times in second at various temperatures of each of the various image-receiving elements:

| PVA/catalyst ratio in image-receiving layer | 40° F. | 100° F. |
|---|---|---|
| Control | 340 | 270 |
| 3.6 | 390 | 410 |
| 6.9 | 715 | 705 |

It can be readily seen that the novel graft vinylpyridine copolymers of the present invention may be used to provide image-receiving elements having more uniform alkali permeability over a wide temperature range, as compared with prior image-receiving elements.

subcoated baryta support, a polymeric acid layer as described in Example XIV, and a spacer layer comprising a graft copolymer of diactone acrylamide and acrylamide on polyvinyl alcohol as described in Example XV. The image-receiving layers of the first four elements all comprised a graft copolymer of 4-vinylpyridine on polyvinyl alcohol having a polyvinyl alcohol/4-vinylpyridine weight ratio of 2/1 and a polyvinyl alcohol/catalyst weight ratio of 3.6, prepared as in Example III, and coated at pH's of 4.5, 7.1, 8.3 and 10.0, respectively. The fifth image-receiving element comprised an image-receiving layer comprising a 2/1 mixture, by weight, of polyvinyl alcohol and poly-4-vinylpyridine, coated at a pH of 4.5, as a control.

Photosensitive elements of the general type described with reference to Example XIV were provided, with the major exception that the particular dye developers employed were metal-complexed dye developers of the following formulae:

a cyan dye developer:

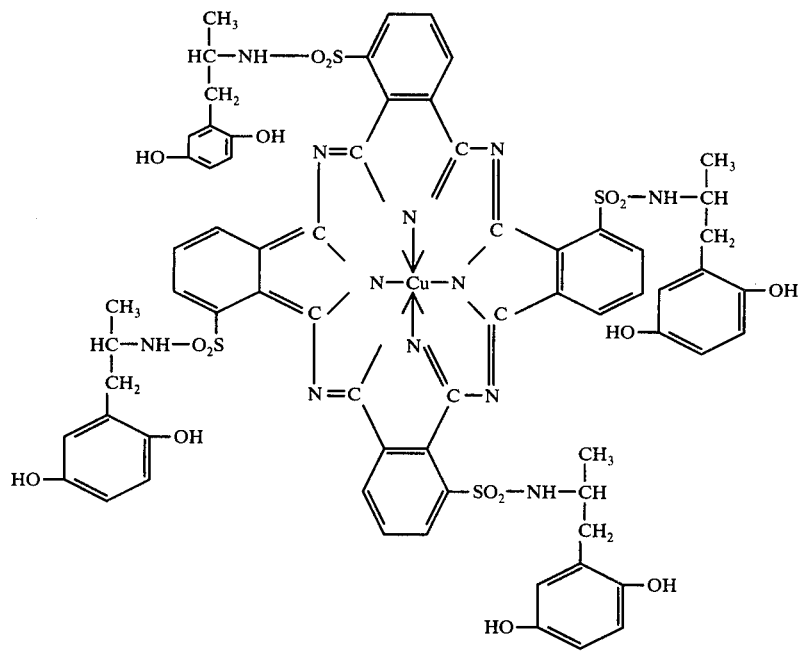

EXAMPLE XVI

A series of five image-receiving elements was prepared, each comprising, in sequence, a cellulose-nitrate-

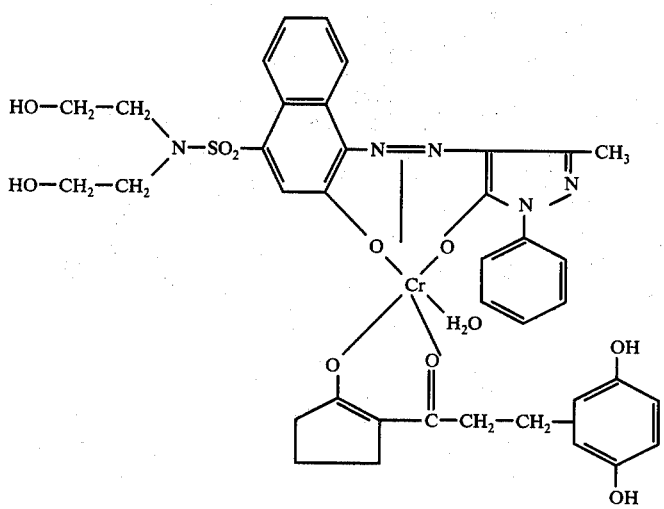

a magenta dye developer; and

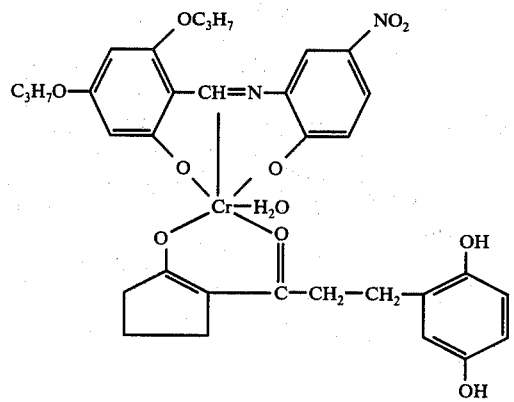

a yellow dye developer. Metallized dye developers of the foregoing types are described in U.S. pat. Nos. 3,482,972; 3,857,855; 3,563,739; 3,551,406; 3,597,200 and 3,705,184.

Each of the photosensitive elements were exposed and processed at room temperature with one of the above-prepared image-receiving elements.

The following is a tabulation of the $D_{max}$ values obtained in the resulting photographic images:

| receiving layer | pH | red $D_{max}$ | green $D_{max}$ | blue $D_{max}$ |
|---|---|---|---|---|
| Control | 4.5 | 2.08 | 2.12 | 2.14 |
| PVA/4-VP graft | 4.5 | 2.55 | 2.35 | 2.32 |
| PVA/4-VP graft | 7.1 | 2.55 | 2.53 | 2.42 |
| PVA/4-VP graft | 8.3 | 2.55 | 2.35 | 2.32 |
| PVA/4-VP graft | 10.0 | 2.52 | 2.24 | 2.22 | it can readily be seen that the graft copolymers of the present invention can be coated over a wide pH range without adversely affecting image densities.

EXAMPLE XVII

An image-receiving element was prepared as in Example XVI but the image-receiving layer comprised the graft copolymer of Example IX, e.g., a graft copolymer of 4-vinylpyridine, vinyl benzyl trimethyl ammonium chloride on hydroxyethyl cellulose. Another image-receiving element comprised an image-receiving layer comprising a 2/1 mixture by weight of polyvinyl alcohol and poly-4-vinylpyridine as a control.

Photosensitive elements of the type used in Example XVIII, e.g., employing metallized dye developers were exposed and processed with each of the above prepared image-receiving elements at room temperature and with the same processing composition.

The following presents a comparison of the d max data after two minutes and after 24 hours.

| receiving layer | d max after two minutes | | |
|---|---|---|---|
| | Red | Green | Blue |
| control | 1.5 | 1.25 | 1.4 |
| graft copolymer of Example X | 3.1 | 2.1 | 2.0 |
| | d max after 24 hours | | |
| control | 2.5 | 2.3 | 2.15 |
| graft copolymer of Example X | 3.0 | 2.45 | 2.35 |

EXAMPLE XVIII

A graft copolymer of 4-vinylpyridine on polyvinyl alcohol having a polyvinyl alcohol/4-vinylpyridine weight ratio of 1/2 and a polyvinyl alcohol/catalyst weight ratio of 1.8 was prepared as described in Example II, using 20 g of polyvinyl alcohol, 40 g. of 4-vinylpyridine, and 11.0 g. Ce(NH$_4$)$_2$(NO$_3$)$_6$ in 25 cc. of water. The graft copolymer so prepared was coated at a pH of 5.1 as the image-receiving layer of an image-receiving element prepared as in Example XVI.

A photosensitive element substantially identical to that of Example XVI was employed, and was exposed and processed with the thus-prepared image-receiving element as described in Example VIII, resulting in an image having a red $D_{max}$ of 2.50, green $D_{max}$ of 2.41 and blue $D_{max}$ of 2.23

EXAMPLE XIX

A graft copolymer of 5-vinyl-2-methylpyridine on polyvinyl alcohol having a polyvinyl alcohol/5-vinyl-2-methylpyridine weight ratio of 1/2 and a polyvinyl alcohol/catalyst weight ratio of 1.8 was prepared by the method of Example I using 20 g. of polyvinyl alcohol, 40 g. of 5-vinyl-2-methylpyridine and 1.1 g. of Ce(NH$_4$)$_2$(NO$_3$) in 10 cc. of water. The graft copolymer so prepared was coated as the image-receiving layer of an image-receiving element comprising a gelatin-sub-coated polyester transparent support and a spacer layer comprising a graft copolymer of diacetone acrylamide and acrylamide on polyvinyl alcohol as described in Example XIII.

EXAMPLE XX

A graft copolymer of 4-vinylpyridine on hydroxyethyl cellulose having a hydroxyethyl cellulose/4-vinylpyridine weight ratio of 1/2 was prepared with a hydroxyethyl cellulose/catalyst weight ratio of 10 by the method of Example I using 11 g. of hydroxyethyl cellulose, 22 g. of 4-vinylpyridine, and 1.1 g. of $Ce(NH_4)_2(NO_3)_6$ in 10 cc. of water. The graft copolymer so prepared was coated as the image-receiving layer of an image-receiving element as described in Example XIX.

EXAMPLE XXI

A series of three photosensitive elements prepared as in Example XIII were exposed and processed with, respectively, the image-receiving elements of Example XXI, Example XIX and a control element identically prepared except that the image-receiving layer thereof comprised a 2/1 mixture, by weight, of polyvinyl alcohol and poly-4-vinylpyridine. A processing composition as described in Example XIII was employed, but which contained additionally a titanium dioxide reflecting material in sufficient quantity to mask the photosensitive element subsequent to exposure and processing; subsequent to processing, the photosensitive element and image-receiving element were not stripped apart, but were maintained in superposed relationship, the final images being viewable through the transparent supports of the respective image-receiving elements. The images resulting from the two graft copolymer image-receiving layers gave excellent, mottle-free images of high density as compared with the control. Moreover, the dye densities were more rapidly achieved with the former than with the control. It was observed, for example, that while the control element required 7 minutes to reach a dye density of 2.0, the same dye density was reached in the element comprising the graft copolymer of 4-vinylpyridine on hydroxyethyl cellulose in less than 2 minutes.

The resulting images were examined for darkening or stain, as determined by $D_{min}$ readings, initially at 24 hours after processing, and again after 22 days, with the following results:

| receiving layer | Stain | | | Stain (after 22 days) | | |
|---|---|---|---|---|---|---|
| | red | green | blue | red | green | blue |
| Control 5-vinyl-2-methyl-pyridine on polyvinyl alcohol | 0.22 | 0.24 | 0.29 | 0.20 | 0.26 | 0.45 |
| 4-vinylpyridine on hydroxyethyl cellulose | 0.20 | 0.21 | 0.24 | 0.21 | 0.25 | 0.37 |
| | 0.20 | 0.21 | 0.24 | 0.22 | 0.27 | 0.39 |

It was noted that the $D_{min}$ areas in the images prepared with the graft copolymer image-receiving layers appeared considerably whiter than those of the control emulsion to an even greater extent that would be expected from the above $D_{min}$ reading.

EXAMPLE XXII

A series of two photosensitive elements were prepared, exposed and processed in the manner described in Example XXI. One element had as the image-receiving layer, a coating of the graft copolymer of Example VIII while the other had a coating of a 2:1:0.25 mixture of polyacrylamide, 4-vinylpyridine, vinylbenzyltrimethylammoniumchloride as the image-receiving layer.

The following presents a comparison of the D max data for the element having the layer containing the graft copolymer and the element having the layer containing a mixture of the ingredients of the graft copolymer composition.

| receiving layer | D max after two minutes | | |
|---|---|---|---|
| | Red | Green | Blue |
| graft copolymer | 2.20 | 2.11 | 2.11 |
| mixture | 1.7 | 1.62 | 1.88 |

EXAMPLE XXIII

The procedure of Example VIII was repeated but 1.2 g. of $Ce(NH_4)_2(NO_3)_6$ was employed as catalyst rather than the 0.55 g. of Example VIII.

EXAMPLE XXIV

The procedure of Example VIII was repeated but 2.2 g. of $Ce(NH_4)_2(NO_3)_6$ were employed as catalyst rather than the 0.55 g. of Example VIII.

EXAMPLE XXV

A series of two photosensitive elements were prepared, exposed and processed in the manner described in Example XXI. One element had as the receiving layer a coating of the graft copolymer of Example XXIII while the other had a coating of the graft copolymer of Example XXIV.

The following presents a comparison of the D max data for the elements and shows that significant improvements in D max can be obtained by increasing the catalyst concentration.

| receiving layer | D max after two minutes | | |
|---|---|---|---|
| | Red | Green | Blue |
| graft copolymer of Example XXIII | 1.96 | 1.74 | 1.61 |
| graft copolymer of Example XXIV | 2.49 | 2.13 | 2.06 |

In preferred embodiments of this invention wherein a polymeric acid layer is included as a component of the novel image-receiving element, the polymeric acid layer preferably is thicker than the image-receiving layer and has an appreciably higher mg./ft.$^2$ coverage. The image-receiving layer is preferably about 0.25 to 0.4 mil. thick, the polymeric acid layer is preferably 0.3 to 1.5 mil. thick, and the image-receiving element spacer layer is preferably about 0.05 to 0.5 mils thick.

EXAMPLE XXVI

A graft polymer of 4-vinylpyridine and vinylbenzyl-dimethyl t-butyl-ammonium chloride on hydroxyethylcellulose having a hydroxyethyl cellulose/4-vinylpyridine/vinylbenzyl-dimethyl t-butyl-ammonium chloride weight ratio of 2.2/2.2/1.0 was prepared as follows:

To a solution of 44 g. hydroxyethylcellulose in 1000 cc. water was added 44 g. 4-vinylpyridine, 41.4 g conc. $HNO_3$ and 20 g. of vinylbenzyl-N,N dimethyl t-butyl-ammonium chloride. Nitrogen was bubbled through the mixture for 1 hour and then 4.4 g. $Ce(NH_4)_2(NO_3)_6$ in 10 cc. water was added. Stirring was continued for 24 hours. The dispersion was then neutralized with concentrated NH₄OH to pH 7.3 and dialyzed. The graft polymer had the following structure:

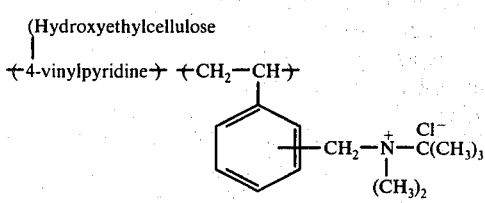

EXAMPLE XXVII

A graft polymer of 4-vinylpyridine and vinylbenzyl-dimethyl-benzyl-ammonium chloride on hydroxyethylcellulose having a hydroxethylcellulose 4-vinylpyridine/vinylbenzyldimethyl-benzyl-ammonium chloride weight ratio of 2.2:2.2:0.5 was prepared as follows:

To a solution of 44 g. hydroxyethylcellulose in 1 liter of water was added 44 g. 4-vinyl pyridine, 44 g. concentrated HNO₃ and 10 g. vinylbenzyl-dimethylbenzyl-ammonium chloride, N₂ was bubbled through the mixture for 1 hour and then 4.49 Ce(NH₄)₂ (NO₃)₆ was added. Stirring was continued for 24 hours. The dispersion was neutralized to pH 7.3 with concentrated NH₄OH and dialyzed.

The graft polymer provided the following structure:

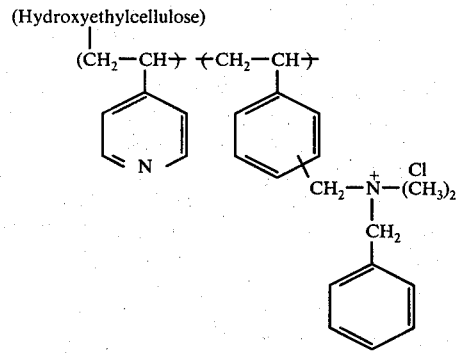

EXAMPLE XXVIII

A graft polymer of 4-vinylpyridine and vinylbenzyl-trimethyl-ammonium chloride on polyvinyl alcohol having a weight ratio of polyvinyl alcohol/4-vinylpyridine/vinylbenzyltrimethyl ammonium halide of 4.4:3.3:1 was prepared as follows:

1760 g. of polyvinyl alcohol were suspended with moderate agitation in 20 liters of deionized water at room temperature. The suspension was allowed to stir for 15 minutes and then the temperature was raised to 95° C. This temperature was maintained until the polyvinyl alcohol was dissolved (30 minutes). The solution was cooled to room temperature and provided a clear solution. At this point, 1320 g. 4-vinylpyridine, 1240 g. conc. nitric acid and 400 g. p-vinylbenzyl-trimethyl-ammonium chloride were added in that order. When all of the reactants were dissolved, nitrogen was bubbled through the stirred solution for 1.5 hours. Both the rate of agitation and the rate of nitrogen flow were adjusted so that an adequate removal of oxygen from the solution was attained. At the end of the nitrogen purge a nitrogen blanket was provided over the solution and a solution of 528 g. ceric ammonium nitrate in 1 liter deionized water which had previously been deairated for 30 minutes was added. The polymerization was initiated at 25° C. and the reaction was allowed to proceed 24 hours. The pH of the solution was then raised to 7.2 by the incremental addition of concentrated NH₄OH (28%). The base was added rather quickly until a persistent emulsion was formed (pH 5) and then more slowly to allow adequate time for equilibration until the desired pH is attained. After pH adjustment the material was dialyzed to a conductivity of 4000.

EXAMPLE XXIX

A graft polymer of 4-vinylpyridine and vinylbenzyl-trimethyl-ammonium chloride on hydroxyethylcellulose having a weight ratio of hydroxyethylcellulose/4-vinylpyridine/vinylbenzyl-trimethyl-ammonium chloride of 2.2:2.2:1 was prepared as follows:

880 g. of hydroxyethylcellulose (Natrosol 250L) were suspended with moderate agitation in 20L of deionized water. The suspension was allowed to stir for 15 minutes and then the temperature was raised to 95° C. This temperature was maintained until the Natrosol was dissolved (30 min.) The solution was quickly cooled to 10° C. and stirred at this temperature for about 15 min. At this point, a clear, water white solution was obtained.

Then, 880 g. 4-vinylpyridine, 828 g. conc. nitric acid and 400 g. p-vinylbenzyl-trimethyl-ammonium chloride were added in that order. When all the reactants were dissolved, N₂ was bubbled into the solution for 1 hour. Both the rate of agitation, and rate of N₂ flow were adjusted so that amount of foam produced was kept at a minimum. At the end of the hour a solution of 88 g. ceric ammonium nitrate in 300 cc. deionized water which had been previously deairated for 30 minutes was added. The polymerization was initiated at 25° C. and the reaction was allowed to proceed overnight (20 hrs.).

The pH of the solution was then raised to 7.5-7.8 by the incremental addition of conc. NH₄OH (28%). The base was added rather quickly until a persistant emulsion was formed (pH 5) and then more slowly to allow adequate time for equilibration until the desired pH was attained. At that point, a solution of 40 g. Triton X-100 in 2 of H₂O was added dropwise and stirring was continued for an additional 20 minutes.

The graft polymers of Examples XXVIII and XXIX are the particularly preferred graft polymers of the present invention. They are excellent dye mordant compositions and image-receiving layers employing these graft polymers alone or in combination with other polymeric image-receiving layer materials have preferred performance characteristics. These preferred graft polymers are particularly useful in providing image-receiving layers for integral negative positive film units of the type disclosed in U.S. Pat. Nos. 3,415,644; 3,415,645; 3,415,646; 3,594,164; 3,594,165 and 3,647,437. All of these Patents are expressly incorporated here by reference.

As mentioned, the graft copolymers presented by way of the present invention essentially comprise a polymeric backbone with a polyvinylpyridine or vinyl-benzyl-ammonium halide — or preferably both — grafted to the backbone. It should be understood that other graftable compounds including those providing a mordant capability can be grafted to the polymeric backbones of the graft polymers of the present invention in addition to the vinylpyridines and/or a vinylbenzyl-ammonium halides. The following examples illustrate the preparation of such graft polymers.

EXAMPLE XXX

A graft copolymer of vinylbenzyl-pyridinum chloride and vinylbenzyl-trimethyl-ammonium chloride on hydroxyethyl cellulose having a hydroxyethyl cellulose/vinylbenzyltrimethyl-ammonium chloride/vinylbenzylpyridinum chloride weight ratio of 2/0.5/0.5 was prepared as follows:

To a solution containing 11 g. hydroxyethyl cellulose in 250 cc. water was added 5.5 g. vinylbenzyl chloride and 0.5 g. concentrated $HNO_3$. Nitrogen was bubbled through the mixture for 1 hour at room temperature. The temperature was then raised to 60° C. and 1.1 g. $Ce(NH_4)_2 (NO_3)_6$ added. Stirring was continued for 2 hours.

To 125 cc. of the graft of vinylbenzyl chloride on hydroxyethyl cellulose (pH 6.0) was added 0.9 g pyridine and 2.7 g. trimethylamine. The mixture was stirred overnight at room temperature and then for 2 hours at 70° C. The pH was adjusted to 7.0.

The polymer provided the following structure:

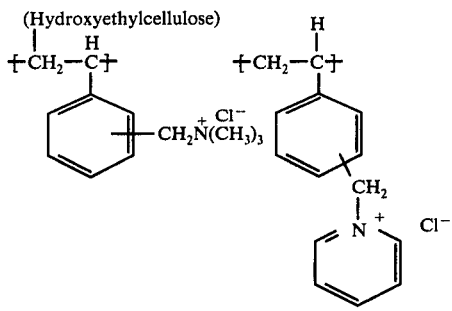

EXAMPLE XXXI

A graft polymer of 4-vinylpyridine and vinylbenzyl N-methyl morpholinium chloride on hydroxyethylcellulose having a hydroxyethyl cellulose/4-vinylpyridine/vinylbenzyl N-methyl morpholinium chloride weight ratio of 2/1/1.4 was prepared as follows:

To a solution of 11 g. hydroxyethylcellulose in 250 cc. of water was added 5.5 g. 4-vinylpyridine, 5.41 g. concentrated $HNO_3$ and 7.6 g. vinylbenzyl-N-methylmorpholinium chloride. Nitrogen was bubbled through the mixture for 1 hour and the temperature raised to 50°. Then 1.1 g. $Ce(NH_4)_2 (NO_3)_6$ in 10 cc. of water was added. Stirring was continued overnight and the pH adjusted to 7.0 with concentrated $NA_4OH$.

The graft polymer provided the following structure:

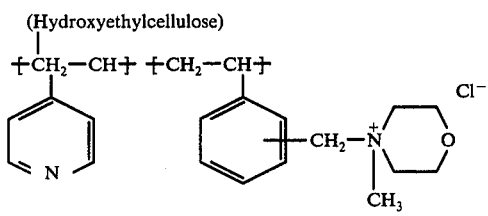

EXAMPLE XXXII

A graft polymer of 4-vinylpyridine, vinylbenzyl-trimethyl-ammonium chloride and diacetone acrylamide on hydroxyethyl cellulose and having a hydroxyethylcellulose/4-vinylpyridine/vinylbenzyl-trimethyl-ammonium chloride/diacetone acrylamide weight rate of 2/1/1.4/0.36 was prepared as follows:

To a solution of 11 g. hydroxyethyl cellulose in 250 cc. of water was added 5.5 g. 4-vinylpyridine, 5.41 g. concentrated $HNO_3$(equiv. + 15%), 7.6 g. vinylbenzyl-trimethyl-ammonium chloride and 2.0 g. diacetone acrylamide. Nitrogen was bubbled through the mixture for 1 hour and the temperature raised to 50° C. The 1.1 g. $Ce(NH_4)_2 (NO_3)_6$ in 10 cc. of water was added. Stirring was continued overnight and the pH was adjusted with conc. $NH_4OH$.

The graft copolymers of the present invention provide stable aqueous emulsions having low viscosity and high solids content. The preferred range is 18–25% solids, with the resulting emulsion having a viscosity of 200–400 centipoises. Depending upon the use, the solids content can vary ± 10%. They may be coated at fast coating machine speeds, and result in clear films.

The method of preparation of the graft polymers is generally the same as that outlined in the hereinbefore stated examples; the pH, however, may vary from 1.5 to about 7 depending upon the catalyst/backbone polymer ratio. Although the transition metal ion catalysts hereinbefore described will initiate homopolymerization of vinylpyridine monomers, for example, the induction periods are so long and the rates so slow that under grafting conditions, little or no such polymerization can occur. As a rule, however, the vinylpyridine graft polymers of the present invention are usually obtained in greater than 99% conversion, and most often in the order of 99.9% conversion, with essentially no residual vinylpyridine homopolymer.

Since certain changes may be made in the above products and processes without departing from the scope of the invention herein involved, it is intended that all matter contained in the above description shall be interpreted as illustrative and not in a limiting sense.

What is claimed is:

1. A graft polymer comprising the structure:

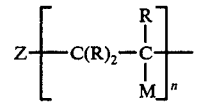

wherein Z is an organic polymeric backbone selected from the group consisting of cellulosic and vinyl polymers and

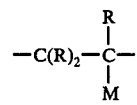

is a grafted residue of a vinylbenzylammonium halide and n is a positive integer.

2. A graft polymer comprising the structure:

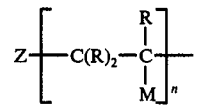

where Z is a polymeric backbone comprising a vinyl polymer selected from the group consisting of polyvinyl alcohols poly-N-vinylpyrollidones and polyacrylamides and

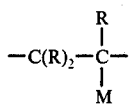

is a grafted residue of a vinylbenzyl-ammonium halide and $n$ is a positive integer.

3. A graft polymer comprising the structure:

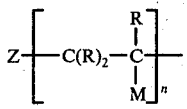

where Z is a polyvinyl alcohol polymeric backbone and

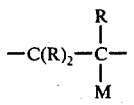

represents a grafted residue of a vinyl benzyl-ammonium halide and, $n$ is a positive integer.

4. A graft polymer of claim 3 where a vinylpyridine and a vinylbenzyl-ammonium halide are grafted to said polyvinyl alcohol backbone.

5. A graft polymer of claim 3 where 4-vinylpyridine and a vinylbenzyl-trialkyl-ammonium chloride are grafted to said polyvinyl alcohol backbone.

6. A graft polymer comprising the following structure:

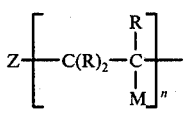

where Z is a poly-N-vinylpyrrolidone polymeric backbone and

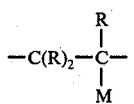

represents a grafted residue of a vinyl-benzyl-ammonium halide and, $n$ is a positive integer.

7. A graft polymer of claim 6 where a vinylpyridine and a vinylbenzyl-ammonium halide are grafted to said poly-N-vinylpyrrolidone backbone.

8. A graft polymer of claim 6 where a 4-vinyl pyridine and a vinylbenzyl trialkyl ammonium chloride are grafted to said poly-N-vinylpyrrolidone backbone.

9. A graft polymer comprising the structure:

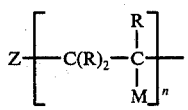

where Z is a polyacrylamide backbone and

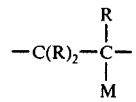

represents a grafted residue of a vinylbenzylammonium halide and, $n$ is a positive integer.

10. A graft polymer of claim 9 where a vinylpyridine and a vinylbenzyl-ammonium halide are grafted to said polyacrylamide backbone.

11. A graft polymer of claim 9 where a 4-vinyl pyridine and a vinylbenzyl trialkyl ammonium chloride are grafted to said polyacrylamide backbone.

12. A graft polymer comprising the structure:

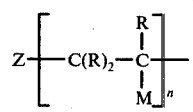

where Z is a polymeric backbone comprising a cellulosic polymer and

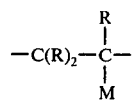

is a grafted residue of a vinyl-benzyl-ammonium halide and, $n$ is a positive integer.

13. A graft polymer comprising the structure:

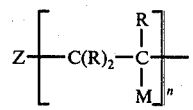

where Z is a hydroxyethylcellulose polymeric backbone and

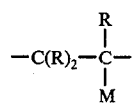

represents a grafted residue of a vinylbenzyl-ammonium halide and, $n$ is a positive integer.

14. A graft polymer of claim 13 where a vinylpyridine and a vinylbenzyl-ammonium halide are grafted to said hydroxyethylcellulose backbone.

15. A graft polymer of claim 13 where a 4-vinylpyridine and a vinylbenzyl-trialkyl-ammonium chloride are grafted to said hydroxyethylcellulose.

16. A graft polymer comprising the structure:

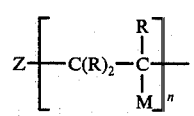

where Z is a methylcellulose polymeric backbone and

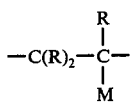

represents a grafted residue of a vinylbenzyl-ammonium halide and, *n* is a positive integer.

17. A graft polymer of claim 16 where a vinylpyridine and a vinylbenzyl-ammonium halide are grafted to said methylcellulose backbone.

18. A graft polymer of claim 16 where a 4-vinylpyridine and a vinylbenzyl-trialkyl-ammonium chloride are grafted to said methylcellulose polymeric backbone.

19. A graft polymer comprising the structure:

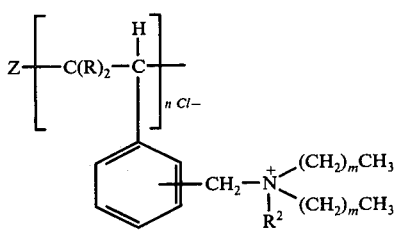

where Z is a hydroxyethylcellulose backbone, $m=0-5$, and $R^2$ is $-(CH_2)_mCH_3$,

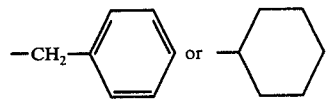

and *n* is a positive integer.

20. A graft polymer comprising the structure:

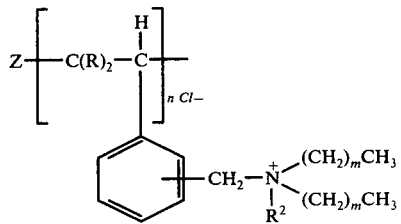

where Z is a polyvinylalcohol backbone, $m=0-5$, and $R^2$ is $-(CH_2)_mCH_3$,

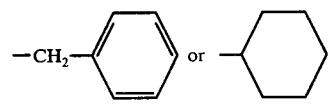

and *n* is a positive integer.

21. A graft polymer having 4-vinylpyridine and vinylbenzyl-trialkyl-ammonium chloride grafted to a hydroxyethyl cellulose backbone and wherein the weight ratio of hydroxyethyl cellulose/4-vinylpyridine/vinylbenzyl-trialkyl-ammonium chloride is about 2.2:2.2:1.

22. A graft polymer of claim 21 where said vinylbenzyl-trialkyl-ammonium chloride is vinylbenzyltrimethyl-ammonium chloride.

23. A graft polymer having 4-vinylpyridine and vinylbenzyl-trialkyl-ammonium chloride grafted to a polyvinyl alcohol backbone and where the weight ratio of polyvinyl alcohol/4-vinylpyridine/vinylbenzyl-trialkylammonium chloride ratio is about 4.4:3.3:1.0.

24. A graft polymer of claim 23 where said vinylbenzyl-trialkyl-ammonium chloride is vinylbenzyltrimethyl-ammonium chloride.

* * * * *

UNITED STATES PATENT AND TRADEMARK OFFICE
CERTIFICATE OF CORRECTION

PATENT NO. : 4,080,346

DATED : March 21, 1978

INVENTOR(S) : Stanley F. Bedell

It is certified that error appears in the above-identified patent and that said Letters Patent are hereby corrected as shown below:

Column 8, line 54, "$CE^{+4}$" should be --$Ce^{+4}$--.

Column 12, line 68, "space" should be --spacer--.

Column 13, line 55, "Natrasol 2501]" should be --Natrasol 250]--.

Column 15, line 5, "second" should be --seconds--.

Column 15, line 12, "6.9" should be --6.0--.

Column 18, line 65, "$Ce(NH_4)_2(NO_3)$" should be --$Ce(NH_4)_2(NO_3)_6$--.

Column 24, line 9, "The" should be --Then--.

Column 27, formula at line 20, should be

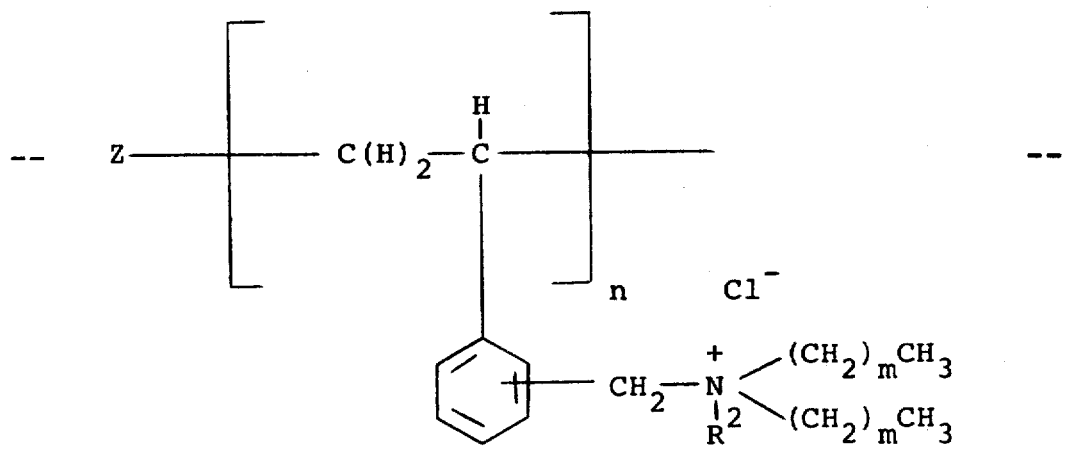

UNITED STATES PATENT AND TRADEMARK OFFICE
CERTIFICATE OF CORRECTION

PATENT NO. : 4,080,346

DATED : March 21, 1978

INVENTOR(S) : Stanley F. Bedell

It is certified that error appears in the above-identified patent and that said Letters Patent are hereby corrected as shown below:

Column 28, formula at line 5, should be

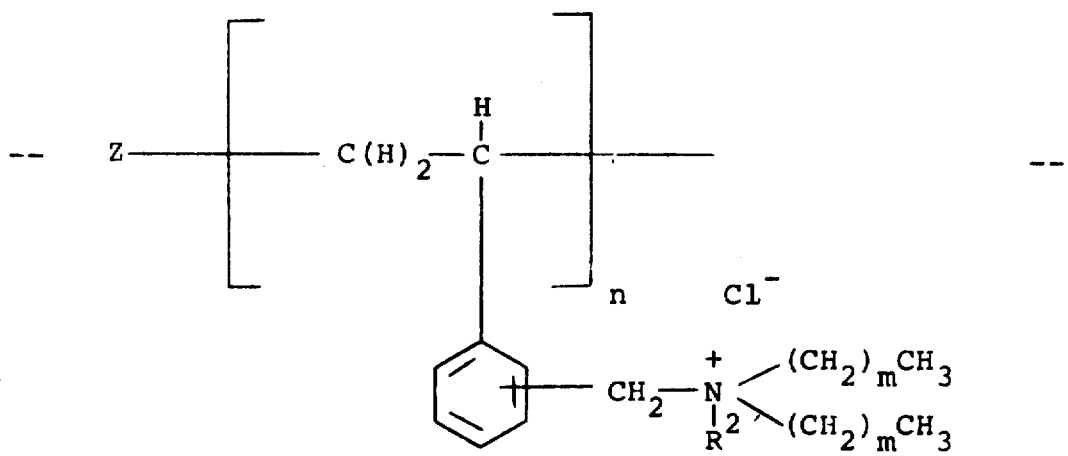

Signed and Sealed this

Twelfth Day of June 1979

[SEAL]

Attest:

RUTH C. MASON
*Attesting Officer*

DONALD W. BANNER
*Commissioner of Patents and Trademarks*